United States Patent
Bai

(10) Patent No.: US 10,442,242 B2
(45) Date of Patent: Oct. 15, 2019

(54) LIGHT EMITTING DEVICE FOR AUTOMOBILE WHEEL

(71) Applicant: BOSSWELL KOREA INC., Seoul (KR)

(72) Inventor: Chang Soo Bai, Seoul (KR)

(73) Assignee: BOSSWELL KOREA INC., Seoul (KR)

( * ) Notice: Subject to any disclaimer, the term of this patent is extended or adjusted under 35 U.S.C. 154(b) by 117 days.

(21) Appl. No.: 15/546,660

(22) PCT Filed: Mar. 23, 2016

(86) PCT No.: PCT/KR2016/002908
§ 371 (c)(1),
(2) Date: Jul. 26, 2017

(87) PCT Pub. No.: WO2016/159557
PCT Pub. Date: Oct. 6, 2016

(65) Prior Publication Data
US 2018/0022149 A1    Jan. 25, 2018

(30) Foreign Application Priority Data

Mar. 27, 2015   (KR) .................. 10-2015-0043157

(51) Int. Cl.
*B60B 7/20*     (2006.01)
*B60Q 1/32*     (2006.01)
(Continued)

(52) U.S. Cl.
CPC ............. *B60B 7/006* (2013.01); *B60B 7/04* (2013.01); *B60B 7/20* (2013.01); *B60Q 1/326* (2013.01);
(Continued)

(58) Field of Classification Search
CPC .. B60B 7/006; B60B 7/20; B60B 7/04; B60R 16/0307; B60Q 1/326
See application file for complete search history.

(56) References Cited

U.S. PATENT DOCUMENTS 2,954,629 A * 10/1960 Matin .................... B60B 7/20
                                                40/587
5,190,354 A *  3/1993 Levy ..................... B60B 7/20
                                                301/37.25
(Continued)

FOREIGN PATENT DOCUMENTS

JP     2004090884 A  *  3/2004
JP     2005-251751 A     9/2005
(Continued)

OTHER PUBLICATIONS

International Search Report for PCT/KR2016/002908, dated Jun. 23, 2016, and its English translation.

*Primary Examiner* — Kip T Kotter

(57) ABSTRACT

A light emitting device for an automobile wheel is capable of generating electrical energy through torque of an automobile wheel, illuminating an advertisement member using the generated electrical energy, and controlling the advertisement member to display advertisement contents at a correct posture without being tilted in response to a reverse magnetic field generated during the electricity generation process.

9 Claims, 11 Drawing Sheets

(51) Int. Cl.
  *B60R 16/03*  (2006.01)
  *B60B 7/04*   (2006.01)
  *B60B 7/00*   (2006.01)
(52) U.S. Cl.
  CPC ........ *B60R 16/0307* (2013.01); *B60B 7/0013* (2013.01); *B60B 7/0053* (2013.01); *B60B 2900/572* (2013.01)

(56) References Cited

U.S. PATENT DOCUMENTS

| | | | | |
|---|---|---|---|---|
| 5,588,715 | A * | 12/1996 | Harlen | B60B 7/20 301/37.25 |
| 6,765,324 | B1 * | 7/2004 | Chien | B60Q 1/326 180/2.2 |
| 7,354,182 | B2 * | 4/2008 | Bartels | B60Q 1/326 362/234 |
| 2002/0125761 | A1 * | 9/2002 | Matushita | B60B 7/20 301/37.25 |
| 2004/0232758 | A1 * | 11/2004 | Freeman | B60B 7/04 301/37.25 |
| 2004/0257825 | A1 * | 12/2004 | Choi | B60Q 1/326 362/500 |
| 2005/0099820 | A1 * | 5/2005 | Cooper | B60Q 1/326 362/500 |
| 2006/0209536 | A1 * | 9/2006 | Bartels | B60C 19/00 362/192 |
| 2009/0015057 | A1 * | 1/2009 | Groomes | B60B 7/20 301/37.108 |
| 2014/0267458 | A1 * | 9/2014 | Fisher | B60B 7/00 345/690 |
| 2015/0170558 | A1 * | 6/2015 | Salah | G09F 21/045 301/5.22 |

FOREIGN PATENT DOCUMENTS

| | | | | |
|---|---|---|---|---|
| KR | 10-20004-0110169 | A | 12/2004 | |
| KR | 10-2005-0116323 | A | 12/2005 | |
| KR | 10-2006-0011745 | A | 2/2006 | |
| KR | 10-1055776 | B1 | 8/2011 | |
| KR | 101147057 | B1 * | 5/2012 | ............ B60B 7/006 |
| KR | 10-1389404 | | 3/2014 | |

* cited by examiner

LIGHT EMITTING DEVICE FOR AUTOMOBILE WHEEL

CROSS-REFERENCE TO RELATED APPLICATION

This application is the National Stage application under 35 U.S.C. § 371 of International Application No. PCT/KR2016/002908, filed on Mar. 23, 2016, which claims the benefit of and priority to Korean Patent Application No. 10-2015-0043157, filed on Mar. 27, 2015, which are herein incorporated by reference in its entirety.

TECHNICAL FIELD

The present invention relates to a light emitting device for a wheel of an automobile, and more particularly, to a light emitting device for a wheel of an automobile, which is capable of generating electrical energy through torque of a wheel of an automobile, illuminating an advertisement member using the generated electrical energy, and controlling the advertisement member to display advertisement contents at a correct posture without being tilted in response to a reverse magnetic field generated during the electricity generation process.

BACKGROUND ART

In general, a vehicle includes wheels installed at both sides of the vehicle body, and tires are mounted on the outer peripheries of the respective wheels. The wheels having tires mounted thereon may include general stainless wheels and aluminum wheels, which are regarded as mainstream.

Recently, a variety of devices have been developed, which can generate electrical energy using torque of a wheel of the automobile having a magnet and coil mounted therein, and illuminate an advertisement member (advertising board) using the generated electrical energy.

The magnet may be fixed to the wheel of the automobile and rotated with the automobile wheel, a circuit board having a coil and lamp may be mounted on a rotating shaft which is rotatably fixed to a hub of the automobile wheel, and the advertisement member (advertising board) having advertisement contents printed thereon may also be mounted on the rotating shaft.

When the automobile wheel is rotated, the magnet may be rotated with the automobile wheel. Therefore, electrical energy generated from the coil through electromagnetic induction caused by the rotated magnet may be provided to the lamp to emit light. The light emitted from the lamp may be provided to the advertising board.

However, a reverse magnetic field may be generated in the opposite direction of the movement direction of the magnet during the electricity generation process. Then, as shown in FIG. 1, the advertisement member (advertising board) may be tilted while showing advertisement contents.

The related art of the present invention is disclosed in Korean Patent Publication No. 10-2004-0110169 published on Dec. 31, 2004.

The related art uses an anti-rotation wing to maintain a fixed state of a stator. However, the anti-rotation wing exhibits low effectiveness, and complicates a manufacturing process while increasing a manufacturing cost.

DISCLOSURE

Technical Problem

An object of the present invention to provide a light emitting device for an automobile wheel, which is capable of generating electrical energy through torque of an automobile wheel, illuminating an advertisement member using the generated electrical energy, and controlling the advertisement member to display advertisement contents at a correct posture without being tilted in response to a reverse magnetic field generated during the electricity generation process.

Technical Solution

In one general aspect, a light emitting device for an automobile wheel includes: a fixed member fixed to a hub of an automobile wheel; a rotor disposed on the fixed member, and generating a magnetic force while being rotated with the fixed member by rotations of the wheel; a rotating shaft protruding from the fixed member; a circuit board disposed on the rotating shaft; a weight eccentrically disposed on the circuit board so as to maintain a fixed state of the circuit board; a stator electrically connected to the circuit board, and generating electrical energy using the magnetic force generated by the rotor, while being fixed to the circuit board; a light emitting member electrically connected to the circuit board, and emitting light using the electrical energy generated by the stator; an idle rotation support body coupled to the rotating shaft, and having an end to which the circuit board is fixed so as not to rotate with the rotating shaft; and an advertisement member fixed to the idle rotation support body so as to display advertisement contents.

The weight may be bent in a circular arc shape.

The rotating shaft may have a male screw thread formed on the outside of an end thereof, and the idle rotation support body may have a female screw thread formed at an end thereof such that the male screw thread is coupled to the female screw thread.

The advertisement member may have a thickness that increases toward the bottom from the top thereof.

The advertisement weight may be bent in a circular arc shape.

The light emitting member may include a first light emitting member mounted at an outer portion of the circuit board and a second light emitting member mounted at an inner portion of the circuit board, and the second light emitting member may irradiate light in a lateral direction toward the center of the circuit board.

The light emitting device may further include a light guide plate having one side coupled to the bearing and the other side coupled to the advertisement member by a predetermined connection member. The light irradiated from the second light emitting member may be guided through total reflection in the light guide plate, and irradiated to the advertisement member.

The light guide plate may have minute optical patterns formed on a reflecting surface thereof, such the light guided to the light guide plate is distributed to the advertisement member.

The optical patterns may be more densely formed toward the outer portion from the center of the reflecting surface of the light guide plate.

Advantageous Effects

According to the aspect of the present invention, the light emitting device for an automobile wheel can generate electrical energy through torque of the automobile wheel, illuminate the advertisement member using the generated electrical energy, and control the advertisement member to display advertisement contents at a correct posture without being tilted in response to a reverse electric field generated during the electricity generation process.

Furthermore, the light emitting device may include the light emitting member and the light guide plate which are mounted at the inner portion of the circuit substrate so as to irradiate in the lateral direction, and prevent an occurrence of dark spot in the central portion of the advertisement member such that the front surface of the advertisement can maintain uniform brightness.

BEST MODE

Figure 1:
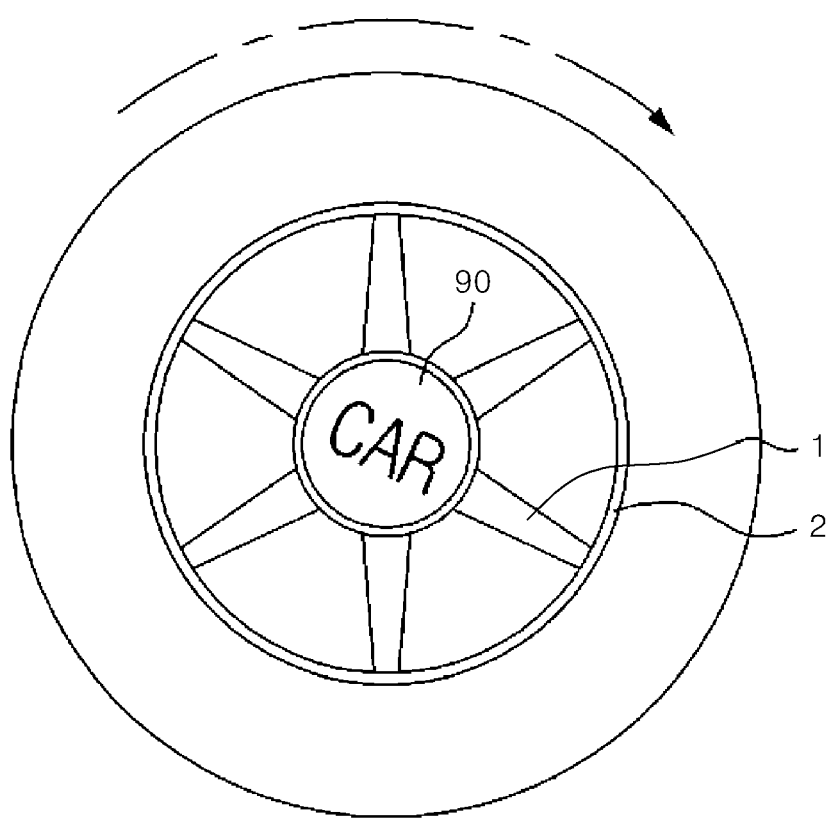
FIG. 1 is a view showing that an advertisement member is tilted in the related art.
Figure 2:
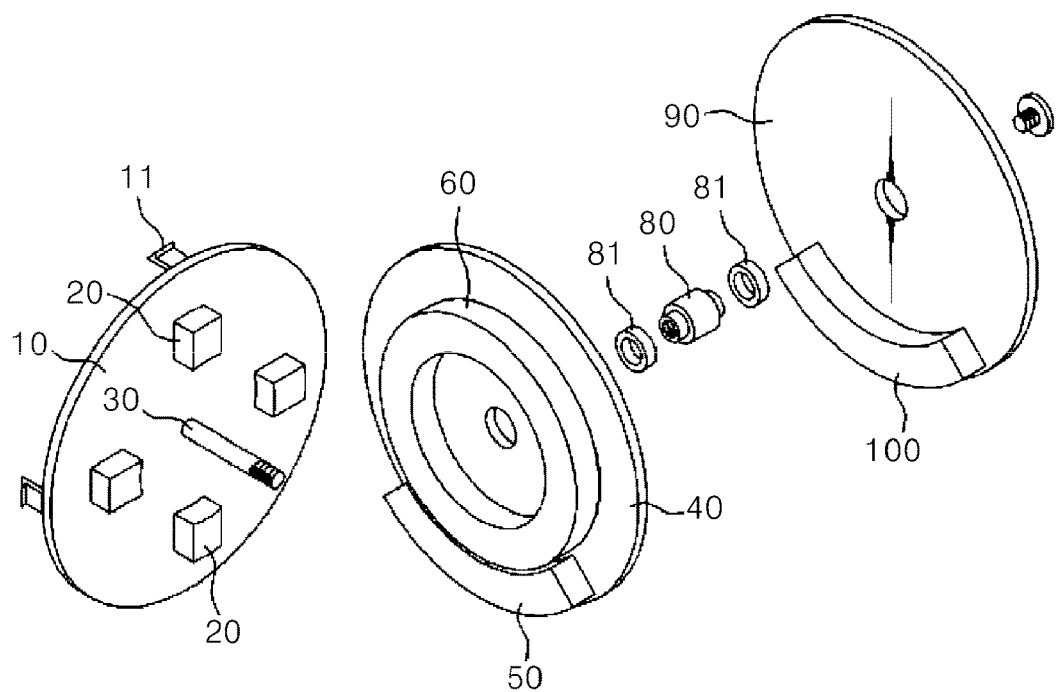
FIG. 2 is an exploded view of a light emitting device for an automobile wheel according to an embodiment of the present invention.
Figure 3:
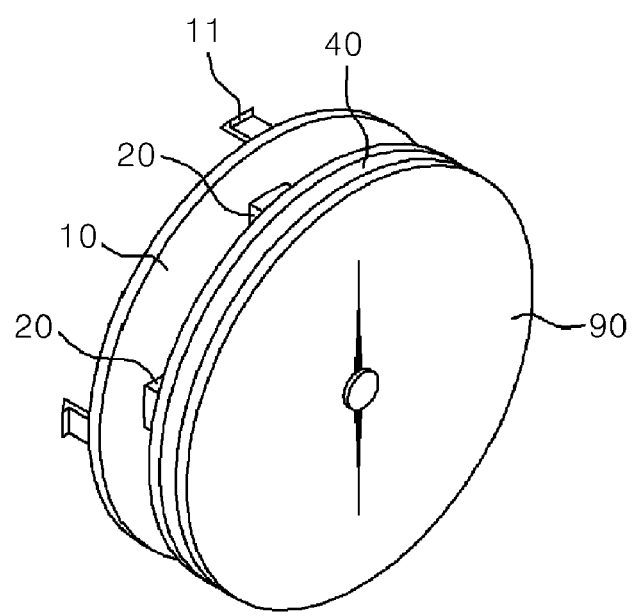
FIG. 3 is a perspective view of the light emitting device for an automobile wheel according to the embodiment of the present invention.
Figure 4:
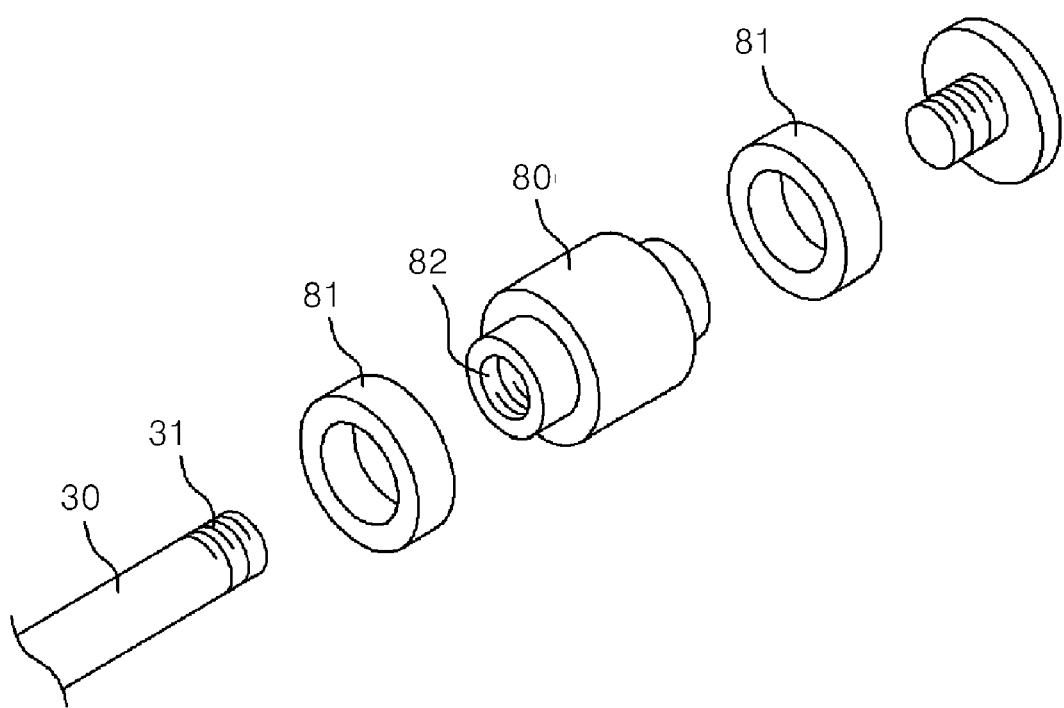
FIG. 4 is an exploded view showing main parts of the light emitting device for an automobile wheel according to the embodiment of the present invention.
Figure 5:
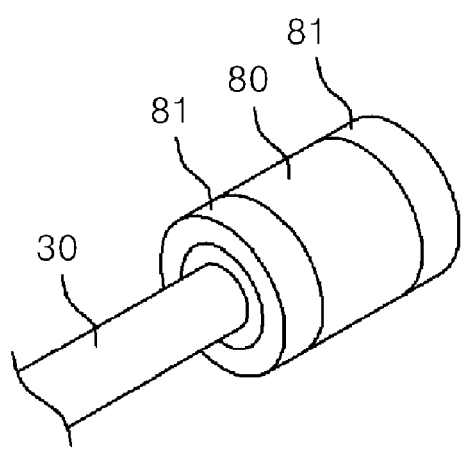
FIG. 5 is a perspective view showing that the main parts of FIG. 4 are assembled.

Hereinafter, embodiments of the present invention will be described in detail with reference to the accompanying drawings.

As shown in FIGS. 2 to 9, a light emitting device for an automobile wheel according to an embodiment of the present invention includes a fixed member 10, a rotor 20, a rotating shaft 30, a circuit board 40, a weight 50, a stator 60, a light emitting member 70, an idle rotation support body 80 and an advertisement member 90.

The fixed member 10 is fixed to a hub 91 (FIG. 9) of a wheel 1 (which also includes a rim 2) of an automobile, formed in a plate shape, and has a wedge-shaped attachment/detachment member 11 formed on the rear surface thereof so as to be attached to/detached from the hub 91 of the automobile wheel 1. Therefore, when the fixed member 10 is pushed against the hub 91 of the automobile wheel 1, the attachment/detachment member 11 is locked and fixed to the hub 91 of the wheel 1. Then, the fixed member 10 is fixed to the hub 91 of the automobile wheel 1.

The rotor 20 is disposed on the fixed member 10, and radiates magnetism while being rotated with the fixed member 10 by rotations of the automobile wheel 1. The rotor 20 may include a magnet. At this time, a plurality of magnets may be radially distributed on the front surface of the fixed member 10.

The rotating shaft 30 may protrude from the center of the fixed member 10, and have a male screw thread 31 formed on the outside of an end thereof. The male screw thread 31 may be coupled to a female screw thread 82 of the idle rotation support body 80.

The circuit board 40 may be disposed on the rotating shaft 30 so as not to rotate with the rotating shaft 30, and configured to provide electrical energy applied from the stator 60 to the light emitting member 70.

The weight 50 may be eccentrically disposed on the circuit board 40 to maintain the fixed state of the circuit board 40, and formed in an elongated shape while bent in a circular arc shape. As the weight 50 is formed in a circular arc shape, the weight 50 can be eccentrically installed at the edge of the circuit board 40, thereby reducing the installation area thereof on the circuit board 40. Furthermore, as the weight 50 is formed in an elongated shape, the weight of the circuit board 40 can be increased.

The stator 60 may be electrically connected to the circuit board 40 and generate electrical energy using the magnetic force generated by the rotor 20, while being fixed to the circuit board 40. The stator 60 may include a coil. Therefore, the stator 60 may generate electrical energy using the magnetic force generated by the rotor 20.

The light emitting member 70 may be electrically connected to the circuit board 40, and emit light using the electrical energy generated by the stator 60. The light emitting member 70 may include a bulb or LED. Therefore, the electrical energy generated by the stator 60 causes the light emitting member 70 to emit light.

The idle rotation support body 80 may be coupled to the rotating shaft 30, and have one end to which the circuit board 40 is fixed so as not to rotate with the rotating shaft 30. At this time, a bearing 81 through which the circuit board 40 is installed may be disposed at the outside of one end of the idle rotation support body 80, or bearings 81 through which the circuit board 40 and the advertisement member 90 are respectively installed may be disposed at the outsides of both ends of the idle rotation support body 80. Therefore, when the circuit board 40 is installed at the one end of the idle rotation support body 80 through the bearing 81, the circuit board 40 may be disposed at the one end of the idle rotation support body 80 so as not to rotate with the rotating shaft 30. Also, as the circuit board 40 and the advertisement member 90 are installed at the respective bearings 81, the circuit board 40 and the advertisement member 90 may be disposed at both ends of the idle rotation support body 80 so as not to rotate with the rotating shaft 30.

The female screw thread 82 formed at the end of the idle rotation support body 80 may be coupled to the male screw thread 31 of the rotating shaft 30. Therefore, the idle rotation support body 80 may be coupled to the rotating shaft 30.

The idle rotation support body 80 may be made of a transparent material or translucent material.

The light emitting device according to the embodiment of the present invention further includes an advertisement weight 100 which is eccentrically disposed on the advertisement member 90 and maintains the fixed state of the advertisement member 90. The advertisement weight 100 may be fixed to the rear surface of the advertisement member 90, and formed in an elongated shape while being bent in a circular arc shape. The advertisement weight 100 may be made of a transparent material or translucent material to transmit light.

Therefore, the fixed state of the advertisement member 90 can be reliably maintained by the advertisement weight 100.

The advertisement member 90 serves to display advertisement contents using light emitted from the light emitting member 70. The advertisement member 90 may be formed in a plate shape having the advertisement contents printed thereon, and made of a transparent or translucent material to transmit light. Therefore, when the light emitted from the light emitting member 70 is irradiated onto the advertisement member 90, the advertisement contents may be brightened to attract pedestrians' attention, thereby increasing the advertisement effect.

Figure 6A:
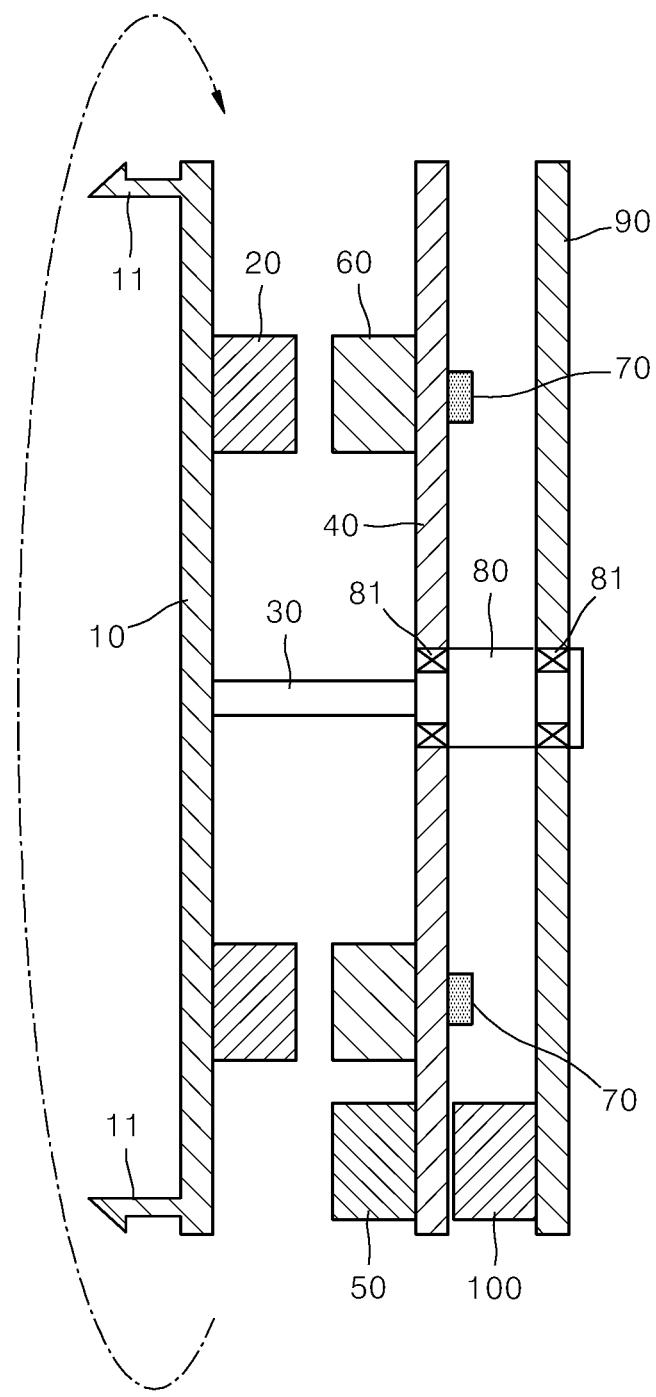
FIGS. 6A and 6B are side views showing operation states of the light emitting device for automobile wheel according to the embodiment of the present invention.
Figure 6B:
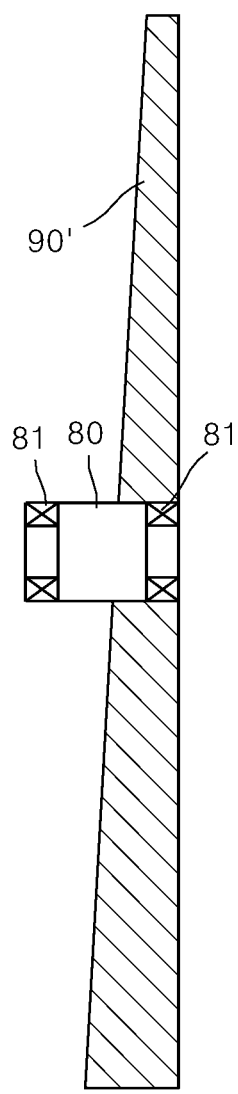

As shown in FIG. 6B, the advertisement member 90' may have a thickness that increases toward the bottom from the top thereof. That is, since the top of the advertisement member 90' has a larger thickness than the bottom thereof, the loading of the advertisement member 90' may be concentrated on the bottom. Thus, the advertisement member 90' can maintain a correct posture without a separate weight.

Figure 7:
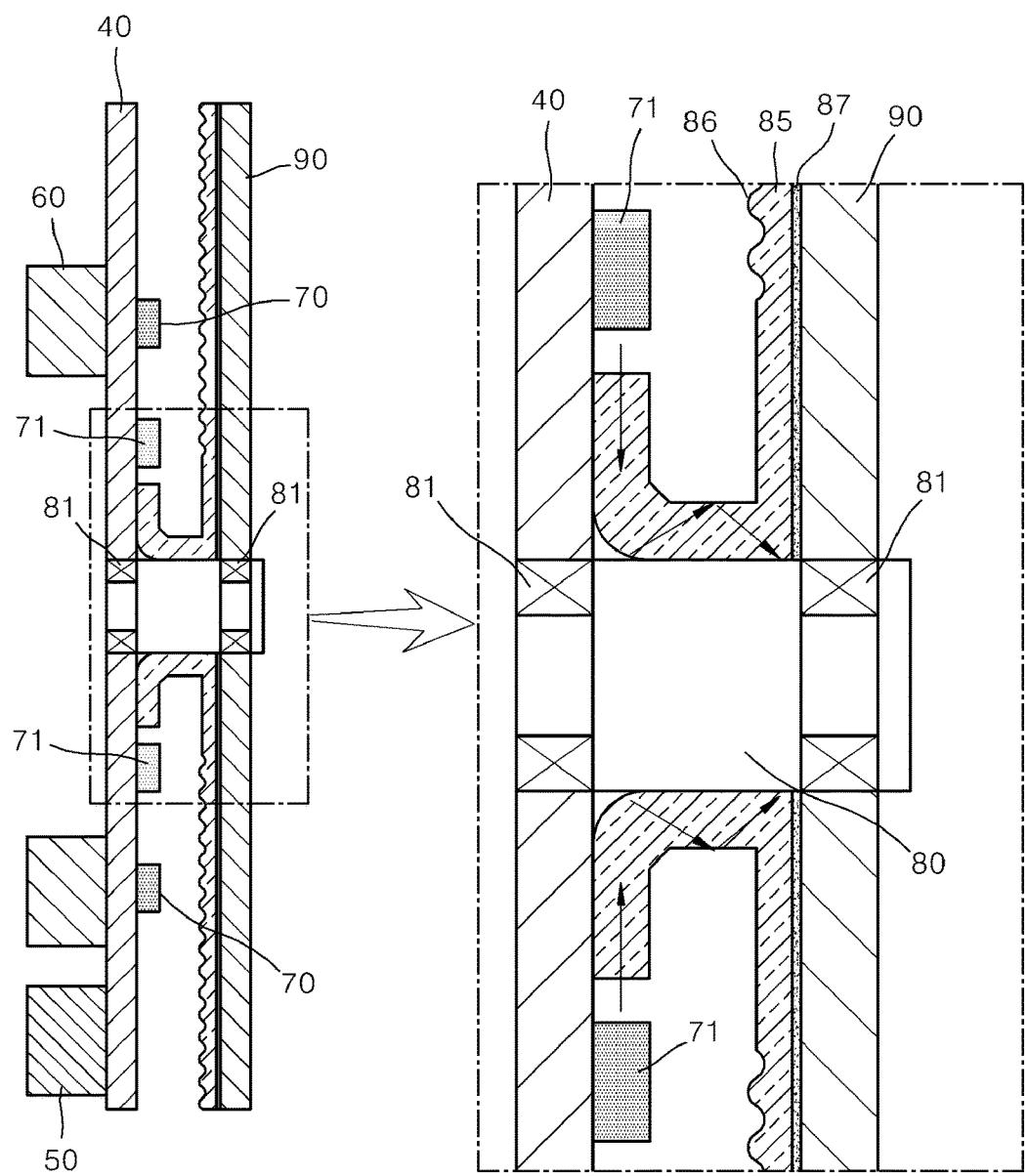
FIG. 7 is a side view showing an operation state of a light emitting device for automobile wheel according to another embodiment of the present invention.
Figure 8:
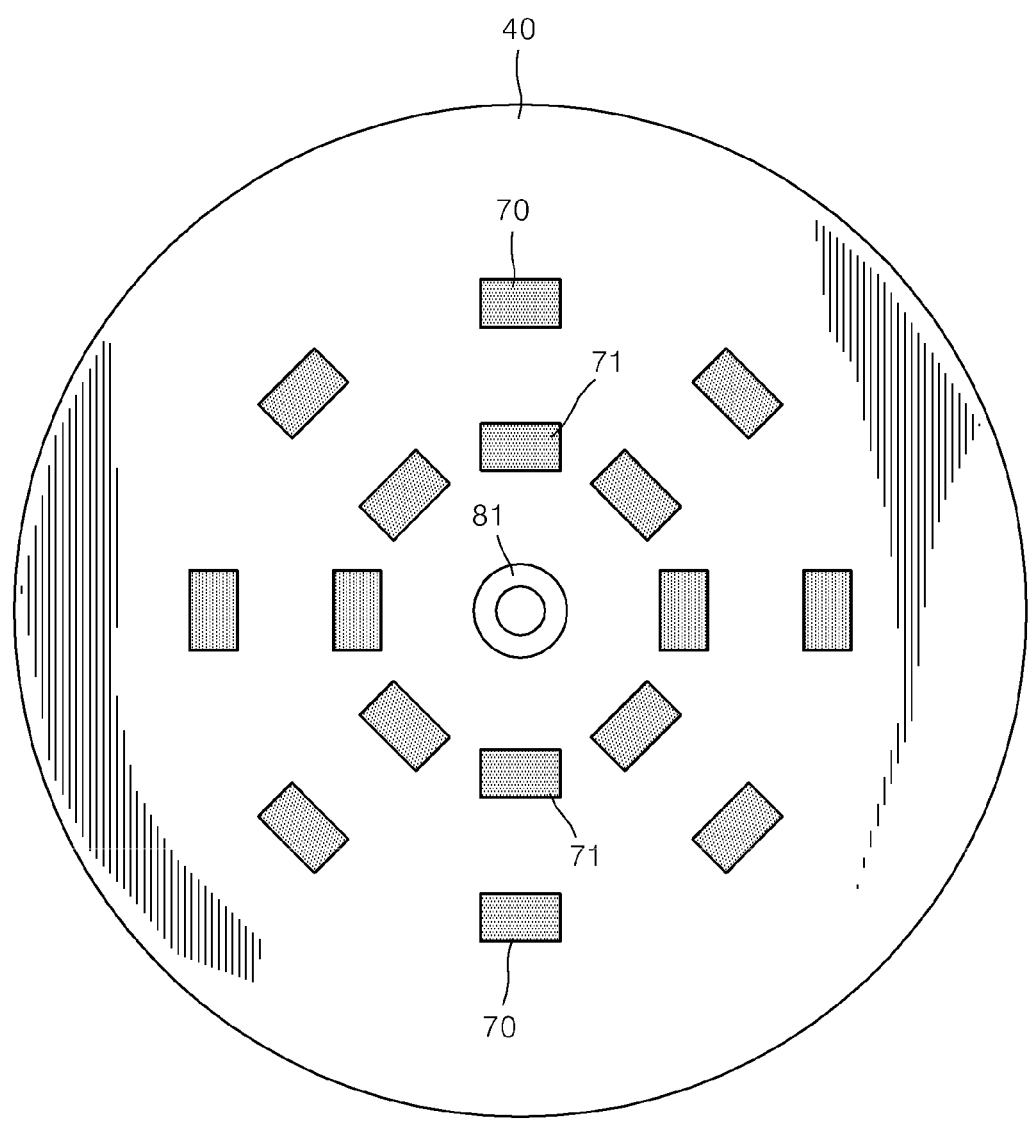
FIG. 8 is a view showing that a light emitting member of FIG. 7 is installed on a circuit board.
Figure 9:
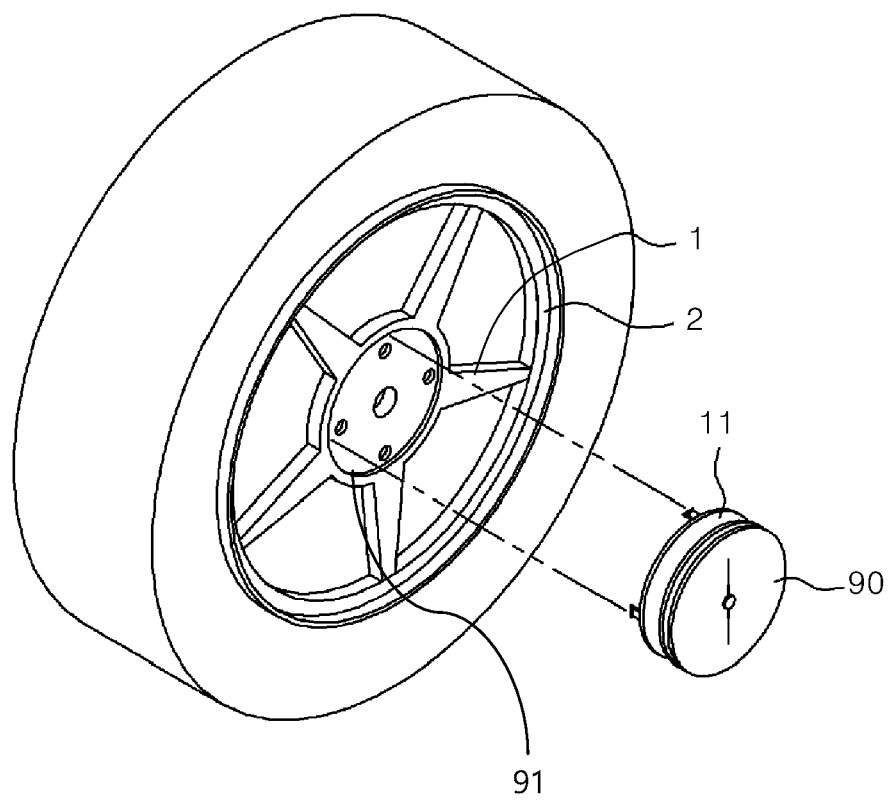
FIG. 9 is a perspective view showing a state before the light emitting device for automobile wheel according to the embodiment of the present invention is mounted on an automobile wheel.
Figure 10:
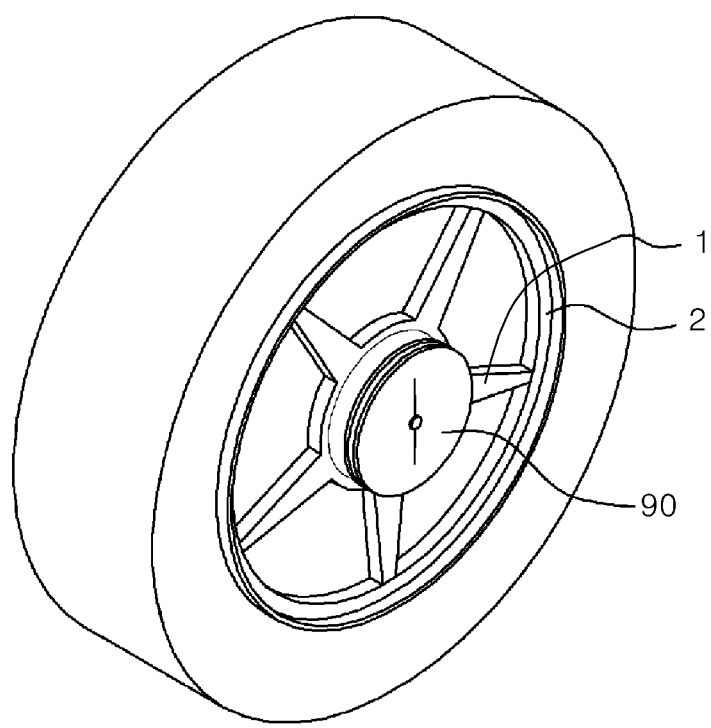
FIG. 10 is a perspective view showing that the light emitting device for automobile wheel according to the embodiment of the present invention is mounted on the automobile wheel.
Figure 11:
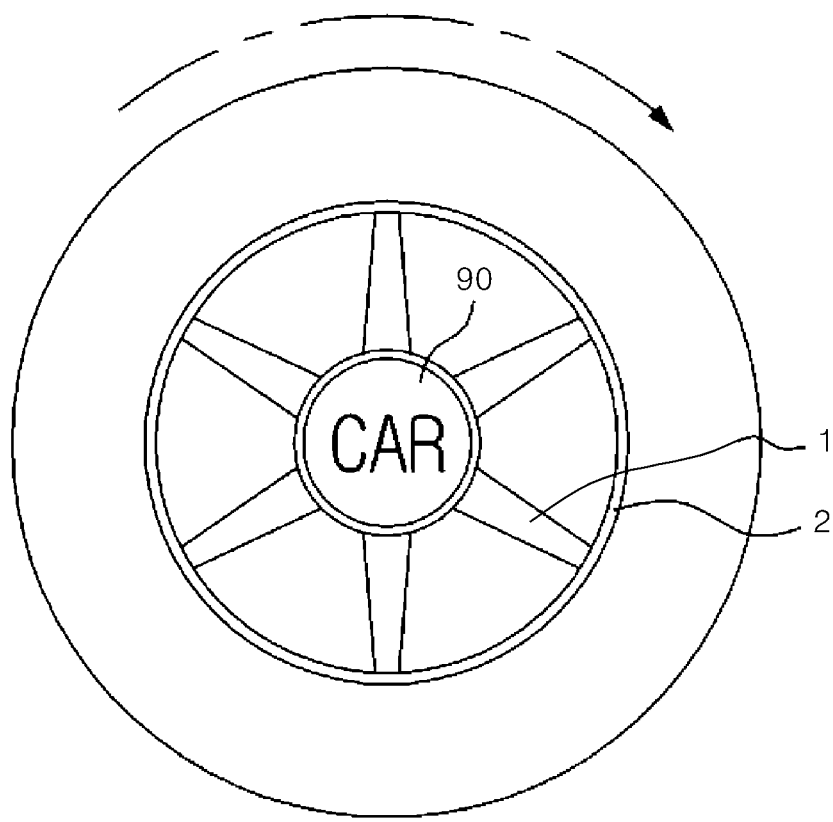
FIG. 11 is a view showing that the advertisement member according to the embodiment of the present invention is not tilted.

FIGS. 7 and 8 illustrate a light emitting device for an automobile wheel according to another embodiment of the present invention. Hereafter, the duplicated descriptions between the above-described embodiment and the embodiment of FIGS. 7 and 8 will be omitted, and the following descriptions will be focused on differences in technical feature therebetween.

Referring to FIG. 7, the light emitting device for an automobile wheel according to the present embodiment includes first and second light emitting members which are electrically connected to the circuit board 40. That is, the first and second light emitting members to emit light using electrical energy generated by the stator 60 are mounted on the outer and inner portions of the circuit board 40, respectively. The first light emitting members 70 mounted at the outer portion of the circuit board 40 emit light using the electrical energy generated by the stator 60 like the light emitting member according to the above-described embodiment, and the light is irradiated onto the advertisement member 90 to display advertisement contents printed on the advertisement member 90.

In this case, since the light is irradiated onto the advertisement member 90 only by the first light emitting members 70, a dark spot which is darker than the periphery of the advertisement member 90 may be formed at the center of the advertisement member 90, when seen from the front of the advertisement member 90. Thus, pedestrians may not clearly understand the advertisement contents of the advertisement member 90.

In order to solve the above-described problem, the light emitting device according to the present embodiment further includes the second light emitting members 71 mounted at the inner portion of the circuit board 40 and a light guide plate 85 to guide light irradiated from the second light emitting members 71.

One side of the light guide plate 85 is coupled to the circuit board 40, and the other side of the light guide plate 85 is coupled to the advertisement member 90 by a connection member 87 such as a transparent double-sided tape.

The second light emitting member 71 is electrically connected to the circuit board 40, and emits light using electrical energy generated by the stator 60. The second light emitting member 71 may include a bulb or LED. The second light emitting member 71 does not irradiate light toward the front, but emits light toward a side. Specifically, the second light emitting member 71 irradiates light toward the center of the circuit board 40, and the light irradiated toward the center of the circuit board 40 is guided along the light guide plate 85 and irradiated onto the advertisement member 90.

In particular, total reflection occurs in the light guide plate 85 such that the light irradiated from the second light emitting member 71 does not escape to the outside of the light guide plate 85. That is, as light with an incident angle equal to or more than a critical angle is totally reflected at the medium interface of the light guide plate 85, the light guided through the light guide plate 85 can be widely diffused onto the advertisement member 90 through an exit surface of the light guide plate 85, and prevent an occurrence of dark spot such that the front surface of the advertisement member 90 can maintain uniform brightness. Furthermore, as the light emitting members are properly installed at the inner and outer portions of the circuit board 40, the number of light emitting members can be reduced, compared to the related art.

The light guide plate 85 may have minute optical patterns 86 formed on the reflecting surface (bottom surface) thereof, such that the light guided through the light guide plate 85 can be uniformly distributed to the advertisement member 90. The optical patterns 86 may include structures such as dots or prisms. At this time, although not illustrated, the optical patterns 86 may be more densely formed as they are away from the light source, in order to irradiate a uniform brightness of light onto the exit surface of the light guide plate 85. The reflection of the light through the reflecting surface of the light guide plate 85 is performed more actively at the inner portion of the reflecting surface than at the outer portion of the reflecting surface. Therefore, in order to uniformly distribute the amounts of light reflected at the inner and outer portions of the reflecting surface, the optical patterns 86 may be more densely formed toward the outer portion from the center of the reflecting surface of the light guide plate 85.

Hereafter, the operation process of the light emitting device according to the embodiment of the present invention will be described.

First, the advertisement member 90 and the circuit board 40 having the stator 60 disposed thereon are installed at one end of the idle rotation support body 80. Then, the idle rotation support body 80 is installed at an end of the rotating shaft 30 protruding from the fixed member 10 having the rotors 20 disposed thereon. Furthermore, the attachment/detachment member 11 of the fixed member 10 is pushed against the hub 91 of the automobile wheel 1 and fixed to the hub 91 of the wheel 1.

In this state, when the automobile wheel 1 is rotated by the operation of the vehicle, the fixed member 10 is rotated with the rotors 20. At this time, since the rotors 20 are rotated to provide a magnetic force to the stator 60, the stator 60 fixed to the circuit board 40 of which the fixed state is maintained by the weight 50 generates electrical energy.

At this time, the circuit board 40 having the stator 60 installed thereon may be tilted by a reverse electric field generated during the electricity generation process by the rotated rotors 20 and the fixed stator 60. That is, the circuit board 40 may be tilted while the weight of the weight 50 is overcome by the reverse electric field.

However, although the circuit board 40 is tilted, the advertisement member 90 having the advertisement weight 100 disposed thereon may not be tilted, but maintained at a correct posture.

Since the circuit board 40 and the advertisement member 90 are rotatably installed at both ends of the idle rotation support body 80, the advertisement member 90 is not tilted even through the circuit board 40 is tilted. That is, the advertisement member 90 can display advertisement contents at the correct posture without being tilted.

Therefore, pedestrians can easily check the advertisement contents through the advertisement member 90 which is not tilted but shines while maintaining the correct posture.

As such, the light emitting devices according to the embodiments of the present invention can generate electrical energy using torque of the automobile wheel, and illuminate the advertisement member using the generated electrical energy, and the circuit board having the stator disposed thereon and the advertisement member having advertisement contents printed thereon are fixed by the respective weights. Therefore, although the circuit board is tilted during the electricity generation process, the advertisement member is not tilted but can display the advertisement contents at the correction posture. Thus, the light emitting device can be applied to automobile wheels and widely used.

While the present invention has been particularly shown and described with reference to exemplary embodiments thereof, it will be understood by those of ordinary skill in the art that various changes in form and details may be made therein without changing the spirit and scope of the present invention. The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

According to the embodiments of the present invention, it is possible to manufacture a light emitting device for an automobile wheel, which is capable of illuminating an advertisement member using electrical energy generated through torque of the automobile wheel, and controlling the advertisement member to display advertisement contents at a correct posture without being tilted in response to a reverse magnetic field generated during the electricity generation process.

The invention claimed is:

1. A light emitting device for a wheel of an automobile, comprising:
   a fixed member which is fixed to a hub of the wheel so that the fixed member rotates together with the wheel;
   a rotor disposed on the fixed member, and is configured to generate a magnetic force while being rotated with the fixed member by rotations of the wheel;
   a rotating shaft protruding from the fixed member;
   a circuit board disposed on the rotating shaft;
   a weight eccentrically disposed on the circuit board so as to maintain a fixed state of the circuit board;
   a stator electrically connected to the circuit board, and configured to generate electrical energy using the magnetic force generated by the rotor while the wheel rotates;
   a light emitting member electrically connected to the circuit board, and is configured to emit light using the electrical energy generated by the stator;
   an idle rotation support body coupled to the rotating shaft, and having an end to which the circuit board is fixed so as not to rotate with the rotating shaft;
   an advertisement member fixed to the idle rotation support body so as to display advertisement contents; and
   an advertisement weight eccentrically disposed on the advertisement member so as to maintain the fixed state of the advertisement member,
   wherein the idle rotation support body has bearings disposed at the outsides of both ends thereof, and the circuit board and the advertisement member are installed through the respective bearings.

2. The light emitting device of claim 1, wherein the weight is bent in a circular arc shape.

3. The light emitting device of claim 1, wherein the rotating shaft has a male screw thread formed on the outside of an end thereof, and
   the idle rotation support body has a female screw thread formed at an end thereof such that the male screw thread is coupled to the female screw thread.

4. The light emitting device of claim 1, wherein the advertisement member has a thickness that increases toward the bottom from the top thereof.

5. The light emitting device of claim 1, wherein the advertisement weight is bent in a circular arc shape.

6. The light emitting device of claim 1, wherein the light emitting member comprises a first light emitting member mounted at an outer portion of the circuit board and a second light emitting member mounted at an inner portion of the circuit board, and
   the second light emitting member irradiates light in a lateral direction toward the center of the circuit board.

7. The light emitting device of claim 6, further comprising a light guide plate having one side coupled to the circuit board and the other side coupled to the advertisement member by a predetermined connection member,
   wherein the light irradiated from the second light emitting member is guided through total reflection in the light guide plate, and irradiated to the advertisement member.

8. The light emitting device of claim 7, wherein the light guide plate has minute optical patterns formed on a reflecting surface thereof, such the light guided to the light guide plate is distributed to the advertisement member.

9. The light emitting device of claim 8, wherein the optical patterns are more densely formed toward the outer portion from the center of the reflecting surface of the light guide plate.

* * * * *